(12) United States Patent
Jayaram et al.

(10) Patent No.: US 10,794,145 B2
(45) Date of Patent: Oct. 6, 2020

(54) LINEAR SHEAR SEAL SYSTEM

(71) Applicant: SCHLUMBERGER TECHNOLOGY CORPORATION, Sugar Land, TX (US)

(72) Inventors: Murali Barathwaj Jayaram, Pearland, TX (US); Michael Krail, Friendswood, TX (US); Omar Carrasquillo, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/518,192

(22) PCT Filed: Oct. 9, 2015

(86) PCT No.: PCT/US2015/054852
§ 371 (c)(1),
(2) Date: Apr. 10, 2017

(87) PCT Pub. No.: WO2016/057879
PCT Pub. Date: Apr. 14, 2016

(65) Prior Publication Data
US 2017/0247979 A1    Aug. 31, 2017

Related U.S. Application Data

(60) Provisional application No. 62/061,963, filed on Oct. 9, 2014.

(51) Int. Cl.
*E21B 34/10* (2006.01)
*F16K 11/07* (2006.01)

(52) U.S. Cl.
CPC .............. *E21B 34/10* (2013.01); *F16K 11/07* (2013.01)

(58) Field of Classification Search
CPC ................................ E21B 34/00; F16K 11/07
See application file for complete search history.

(56) References Cited

U.S. PATENT DOCUMENTS

| | | |
|---|---|---|
| 3,329,168 A | 7/1967 | Vollmer |
| 3,601,149 A | 8/1971 | Gilmore |

(Continued)

FOREIGN PATENT DOCUMENTS

| | | |
|---|---|---|
| GB | 2277573 A | 11/1994 |
| WO | WO2013130096 A1 | 9/2013 |

OTHER PUBLICATIONS

International Search Report and Written Opinion of International Patent Application No. PCT/US2015/054852 dated Jan. 22, 2016, 16 pages.

(Continued)

*Primary Examiner* — Tara Schimpf
*Assistant Examiner* — Dany E Akakpo

(57) ABSTRACT

A technique facilitates control over fluid flow via controlled operation of a flow control valve. The flow control valve comprises a first component with a hydraulic flow configuration and a second component with a corresponding hydraulic flow configuration. The first component and the second component are mounted in a body such that the second component is shiftable between operational positions with respect to the first component. Shifting of the second component relative to the first component causes the hydraulic flow configuration and the corresponding hydraulic flow configuration to move into different cooperating flow configurations which provide different flow paths through the flow control valve. Additionally, the first and second components are biased toward sealing engagement with each other.

20 Claims, 4 Drawing Sheets

(56) References Cited

U.S. PATENT DOCUMENTS

| | | | |
|---|---|---|---|
| 3,917,220 A | 11/1975 | Gilmore | |
| 4,160,463 A * | 7/1979 | Akkerman | E21B 34/16 |
| | | | 137/458 |
| 4,187,883 A | 2/1980 | Webster | |
| 4,258,786 A * | 3/1981 | Lochte | E21B 34/16 |
| | | | 137/625.18 |
| 4,405,014 A * | 9/1983 | Talafuse | E21B 34/16 |
| | | | 166/72 |
| 4,444,216 A | 4/1984 | Loup | |
| 4,475,568 A | 10/1984 | Loup | |
| 4,493,335 A | 1/1985 | Watson | |
| 4,793,591 A | 12/1988 | Decker et al. | |
| 4,856,557 A | 8/1989 | Watson | |
| 5,785,074 A | 7/1998 | Kieper | |
| 6,247,536 B1 | 6/2001 | Leismer et al. | |
| 6,651,696 B2 | 11/2003 | Hope et al. | |
| 7,000,890 B2 | 2/2006 | Bell et al. | |
| 7,520,297 B2 | 4/2009 | Bell et al. | |
| 7,757,703 B2 | 7/2010 | Bell et al. | |
| 8,438,910 B2 | 5/2013 | Berndt | |
| 9,121,244 B2 | 9/2015 | Loretz et al. | |
| 9,863,215 B2 | 1/2018 | Jayaram et al. | |
| 2004/0135112 A1 | 7/2004 | Greeb et al. | |
| 2010/0307832 A1 | 12/2010 | Mock et al. | |
| 2013/0119288 A1 | 5/2013 | Shaw | |
| 2013/0269928 A1 | 10/2013 | Zhou | |
| 2015/0191996 A1 * | 7/2015 | Weintraub | E21B 34/101 |
| | | | 166/320 |

OTHER PUBLICATIONS

International Preliminary Report on Patentability of International Patent Application No. PCT/US2015/054852 dated Apr. 20, 2017, 12 pages.

Search Report and Written Opinion of International Patent Application No. PCT/US2014/010402 dated Apr. 23, 2014, 14 pages.

* cited by examiner

LINEAR SHEAR SEAL SYSTEM

CROSS-REFERENCE TO RELATED APPLICATIONS

The present document is based on and claims priority to U.S. Provisional Application Ser. No.: 62/061,963 filed Oct. 9, 2014, which is incorporated herein by reference in its entirety.

BACKGROUND

Hydrocarbon fluids, e.g. oil and natural gas, are obtained from a subterranean geologic formation, referred to as a reservoir, by drilling a well that penetrates the hydrocarbon-bearing formation. Once a wellbore is drilled, various forms of well completion components may be installed to control and enhance the efficiency of producing fluids from the reservoir. One piece of equipment which may be installed is a flow control valve. Flow control valves function to choke flow from a well annulus into a tubing in the case of a production valve and from an interior of the tubing to the surrounding annulus in the case of an injection valve. In a variety of applications, controlling the flow control valve and ensuring sealing poses a number of challenges.

SUMMARY

In general, a system and methodology are provided for controlling fluid flow via a flow control valve. The flow control valve comprises a first component with a hydraulic flow configuration and a second component with a corresponding hydraulic flow configuration. The first component and the second component are mounted in a body such that the second component is shiftable between operational positions with respect to the first component. Shifting of the second component relative to the first component causes the hydraulic flow configuration and the corresponding hydraulic flow configuration to move into different cooperating flow configurations which provide different flow paths through the flow control valve. Additionally, the first and second components are biased toward sealing engagement with each other.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The disclosure herein generally relates to a system and methodology for controlling fluid flow, e.g. fluid flow in a wellbore. For example, at least one flow control valve may be disposed along a tubing string, e.g. a production and/or injection tubing string, deployed along the wellbore. The flow control valve may comprise linear shear seal components oriented to form a linear sealing surface. The linear shear seal components may be arranged for relative linear motion with respect to each other to enable shifting to different flow positions. Additionally, the linear shear seal components may be biased toward each other to further enhance sealing along the linear sealing surface.

In various embodiments, the flow control valve comprises a first component with a hydraulic flow configuration and a second component with a corresponding hydraulic flow configuration. The first component and the second component are mounted in a body such that the second component is linearly shiftable between operational positions with respect to the first component. Shifting of the second component relative to the first component causes the hydraulic flow configuration and the corresponding hydraulic flow configuration to move into different cooperating flow configurations. The different cooperating flow configurations provide different flow paths through the flow control valve. The first and second components may be biased toward sealing engagement with each other by mechanical and/or hydraulic mechanisms.

Figure 1:
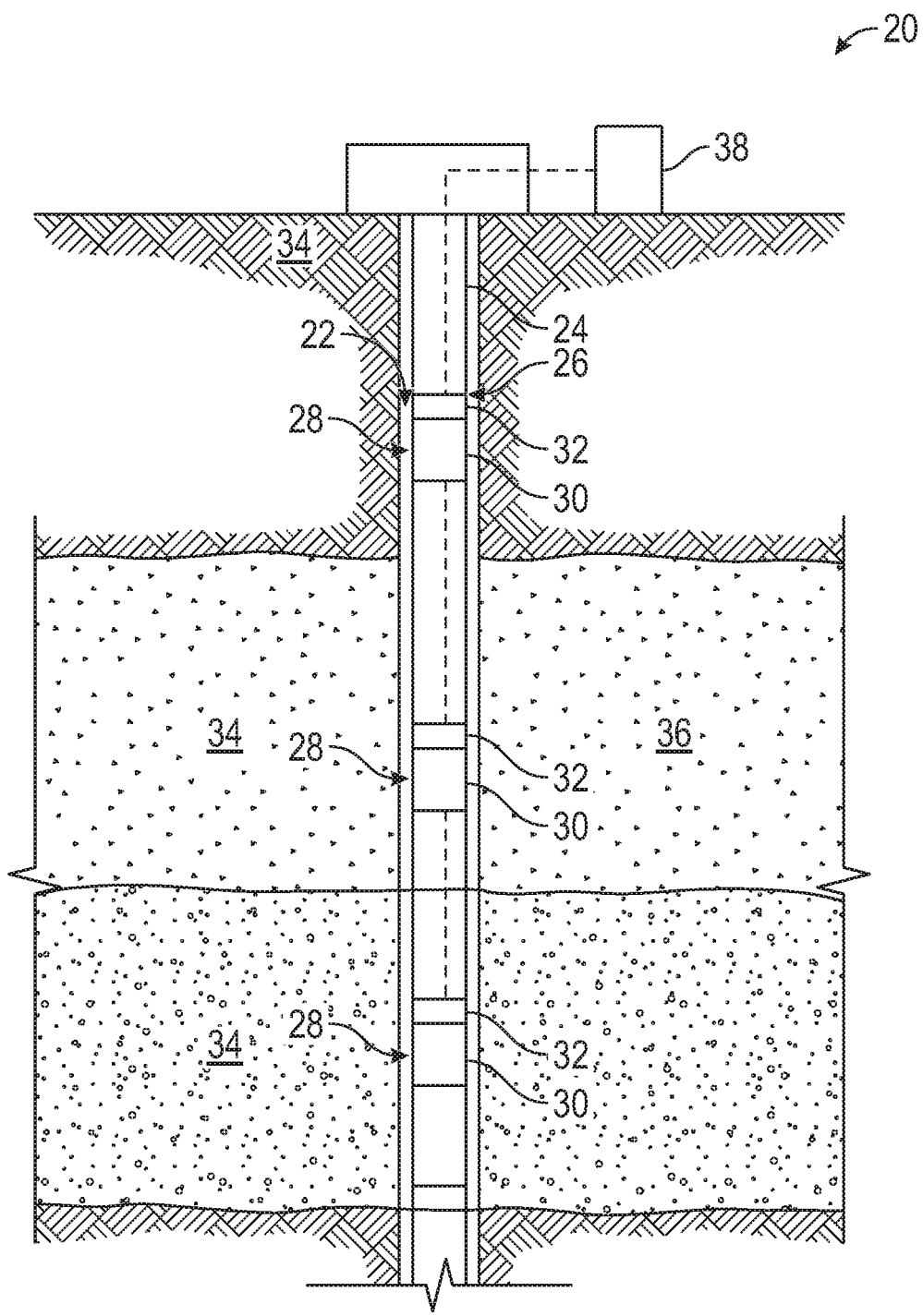
FIG. 1 is a schematic illustration of a well system deployed in a wellbore and including a plurality of flow control valve assemblies, according to an embodiment of the present invention.

Referring generally to FIG. 1, an embodiment of a well system 20 for controlling flow of fluid in a wellbore 22 is illustrated. In this embodiment, well system 20 comprises a tubing string 24 which may include various types of downhole equipment 26. The tubing string 24 and downhole equipment 26 further comprise at least one and often a plurality of flow control valve assemblies 28. Each flow control valve assembly 28 comprises a flow control valve 30 coupled to a corresponding actuation control mechanism 32, e.g. a hydraulic flow controller. By way of example, the flow control valves 30 may be shifted to different flow positions via hydraulic input controlled by the actuation control mechanism or mechanisms 32. In some applications, the control mechanism 32 may be located downhole, as illustrated, and in other applications the hydraulic control mechanism 32 may be located at the surface for controlling flows of hydraulic actuation fluid through hydraulic control lines extending to the individual flow control valves 30.

By way of example, the flow control valves 30 may be used to control inflow of reservoir fluid or outflow of injection fluid with respect to a plurality of well zones 34 in a surrounding reservoir 36. It should be noted that downhole equipment 26 may comprise a variety of packers and other equipment designed to isolate the various well zones 34 along wellbore 22. In at least some embodiments, the flow control valves 30/hydraulic control mechanisms 32 may be independently controlled via a control system 38, such as a surface located computer-based control system.

Figure 2:
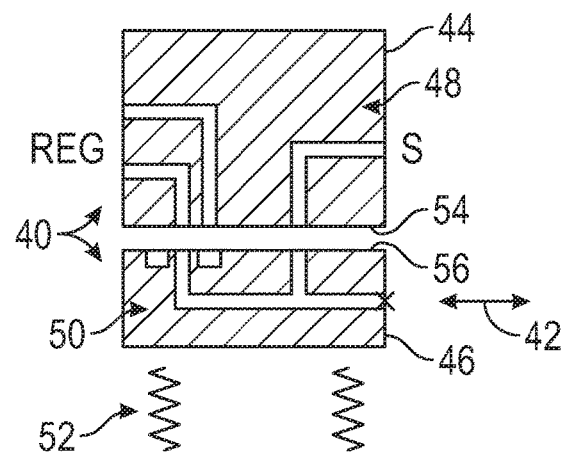
FIG. 2 is a schematic illustration of an example of shear seal components having a hydraulic flow configuration and a corresponding hydraulic flow configuration, respectively, to enable flow control in a flow control valve, according to an embodiment of the present invention.

Referring generally to FIG. 2, a schematic illustration is provided of linear shear seal components 40 that may be utilized in each of the flow control valves 30 to control fluid flow. In this particular example, the linear shear seal components 40 move with respect to each other in a linear direction, as represented by arrow 42. By way of example, the linear shear seal components 40 may comprise a stationary portion or component 44 and a dynamic or movable component 46. The stationary portion 44 comprises fluid channels arranged in a hydraulic flow configuration or circuit 48. Similarly, the dynamic component 46 has fluid channels arranged in a corresponding hydraulic flow configuration or circuit 50. The dynamic component 46 may be shifted linearly with respect to the stationary portion 44 in the direction of arrow 42 so as to shift the hydraulic flow configuration 48 and the corresponding hydraulic flow configuration 50 into different operational flow positions. The different operational flow positions provide different flow configurations and different flows through the corresponding flow control valve 30.

As illustrated, the dynamic component 46 and the stationary portion 44 may be biased transversely toward each other via a suitable spring member 52 or other biasing arrangement. The transverse bias effectively forces a linear seal surface 54 of stationary portion 44 into engagement with a corresponding linear seal surface 56 of dynamic component 46. The transverse biasing force created between the linear seal surfaces 54, 56 ensures better sealing between the components 44, 46 as fluid flows through the cooperating hydraulic flow configurations 48, 50.

Figure 3:
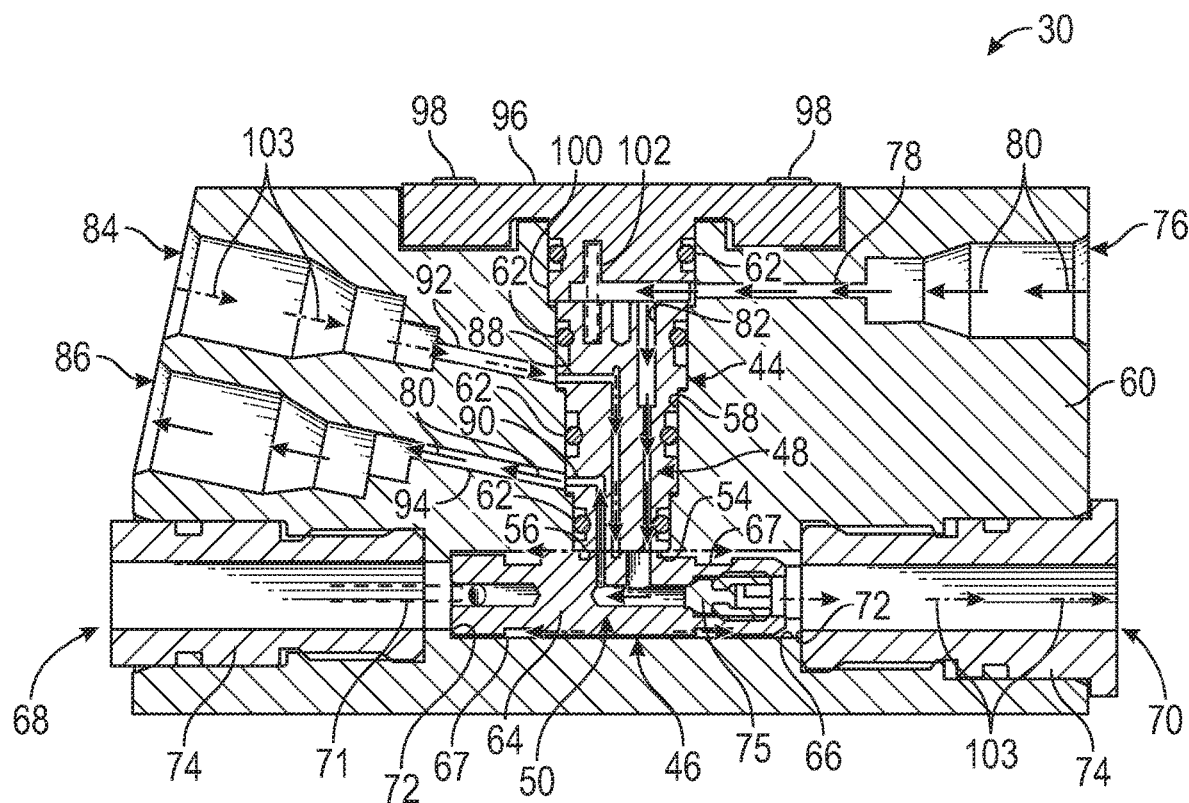
FIG. 3 is a cross-sectional view of an example of a flow control valve having shear seal components, according to an embodiment of the present invention.

Referring generally to FIG. 3, a cross-sectional illustration is provided of an embodiment of flow control valve 30 utilizing the stationary linear seal portion 44 and the dynamic linear seal component 46. In this example, the stationary portion 44 is received in a recess 58 formed in a valve body or housing 60. The stationary portion 44 may be sealed with respect to the valve body 60 via a plurality of seals 62 arranged to seal between fluid channels of hydraulic flow configuration 48.

The stationary portion 44 presents linear seal surface 54 at one of its ends for linear, sliding engagement with dynamic component 46. In this embodiment, the dynamic component 46 is in the form of a shuttle 64 oriented to position corresponding linear seal surface 56 in linear, sliding engagement with linear seal surface 54. By way of example, the shuttle 64 may be slidably received in a corresponding passage 66 of the valve body 60. Additionally, the shuttle 64 may be sealed with the surrounding surface forming passage 66 via a seal or seals 67. A pair of passages 68, 70, e.g. flow line passages, extends into fluid communication with corresponding passage 66, as discussed in greater detail below.

To control the fluid flow through flow control valve 30, the shuttle 64 may be shifted linearly along corresponding passage 66 between different operational flow positions. In this example, the dynamic component 46/shuttle 64 may be shifted linearly via a mechanical member 71 such as a mechanical rod or other mechanical member extending into engagement with shuttle 64 through passage 68. The mechanical member 71 is moved linearly to selectively shift shuttle 64 to a desired flow position. In another embodiment, dynamic component 46/shuttle 64 may be shifted linearly via the pressure of a hydraulic actuating fluid selectively supplied via passages 68, 70. The linear movement of shuttle 64 may be limited via abutments 72 formed by, for example, body 60 and/or control line couplings 74 of pressure control lines 68, 70. It should be noted that in some applications, the flow conduits of the hydraulic flow configuration 48 and/or corresponding hydraulic flow configuration 50 may be machined and subsequently enclosed by a suitable plug or plugs 75.

In the embodiment illustrated, the body 60 comprises a supply port 76 in fluid communication with the hydraulic flow configuration 48 of stationary portion 44 via flow conduit 78. By way of example, supply port 76/flow conduit 78 may be used to direct a flow of fluid, as represented by arrows 80, to an inlet port 82 of hydraulic flow configuration 48. The body 60 also comprises a plurality of reg ports, e.g. a pair of reg ports 84, 86. The reg ports 84, 86 are in fluid communication with corresponding ports 88, 90, respectively, of hydraulic flow configuration 48. For example, the reg ports 84, 86 may be fluidly coupled with the hydraulic flow configuration 48 via flow conduits 92, 94.

Referring again to FIG. 3, the stationary portion 44 may be held in place within recess 58 by a suitable cover 96. By way of example, the cover 96 may be secured to body 60 by a suitable fastener or fasteners 98. In some applications, fasteners 98 are in the form of threaded fasteners, e.g. bolts, by which the cover 96 is bolted securely to the valve body 60. In the illustrated example, the cover 96 comprises an extended portion 100 which is sized and configured for insertion into recess 58 and into engagement with an end of stationary portion 44 opposite linear seal surface 54.

The extended portion 100 may be used as a biasing member which exerts a force against stationary portion 44 as fasteners 98 are tightened. The biasing member/extended portion 100 exerts a force on the stationary portion 44 in a generally transverse direction relative to the direction of linear movement (see arrow 42). This biasing force causes the stationary portion 44 to shift transversely toward an enhanced sealing engagement with the dynamic component 46. It should be noted that a supply pressure provided by the flow of fluid 80 through supply port 76 may be used to provide an additional clamping force which further holds the stationary portion 44 and dynamic component 46 together so as to prevent leakage as fluid flows through hydraulic flow configuration 48 and corresponding hydraulic flow configuration 50.

In some applications, an alignment feature 102 may be used between cover 96 and stationary portion 44 to ensure a desired rotational positioning of the stationary portion 44 and its hydraulic flow configuration 48. By way of example, the alignment feature 102 may be in the form of a dowel pin, although the feature 102 may comprise various pins, keys, and/or other features which provide the desired alignment of stationary portion 44. As illustrated, one or more of the seals 62 also may be positioned along cover 96 to ensure sealing engagement with valve body 60.

During operation, the dynamic component 46, e.g. shuttle 64, may be shifted to a desired operational position by mechanical member 71. As illustrated in FIG. 3, for example, mechanical member 71 has been used to shift shuttle 64 linearly to the left until the shuttle 64 engages the left-side abutment 72. This shifting of shuttle 64 aligns the hydraulic flow configuration 48 of stationary portion 44 with the corresponding hydraulic flow configuration 50 of shuttle 64 in a desired flow configuration. In another operational example, the dynamic component 46, e.g. shuttle 64, may be shifted to a desired operational position by applying higher pressure actuating fluid in either passage 68 or passage 70. If fluid pressure in passages 68, 70 is used to shift shuttle 64, suitable dynamics seals can be fitted to the shuttle 64 to facilitate maintenance of a pressure seal during repeated shifting of the shuttle.

Specifically, the supply fluid 80 flowing in through supply port 76 travels under pressure along the flow conduit 78 and into hydraulic flow configuration 48 via inlet port 82. The flowing fluid is directed through the stationary portion 44 and into the corresponding hydraulic flow configuration 50 of shuttle 64. The fluid continues to flow through the corresponding hydraulic flow configuration 50 and back into the desired fluid channel of hydraulic flow configuration 48 until exiting port 90 as further illustrated by arrows 80. After exiting port 90, the fluid 80 is directed through flow conduit 94 and out through reg port 86.

In at least some applications, a simultaneous, lower pressure return fluid flow, as represented by arrows 103, flows into the other reg port, i.e. reg port 84. The return flow of fluid flows through conduit 92 and into the hydraulic flow configuration 48 of stationary portion 44 via port 88. The return fluid flow is directed along corresponding return flow channels of hydraulic flow configuration 48 and discharged out of valve body 60 as illustrated. By way of example, the return flow may be directed along passages through or adjacent shuttle 64 until discharged through one of the passages 68, 70 or through another appropriate discharge passage.

Figure 4:
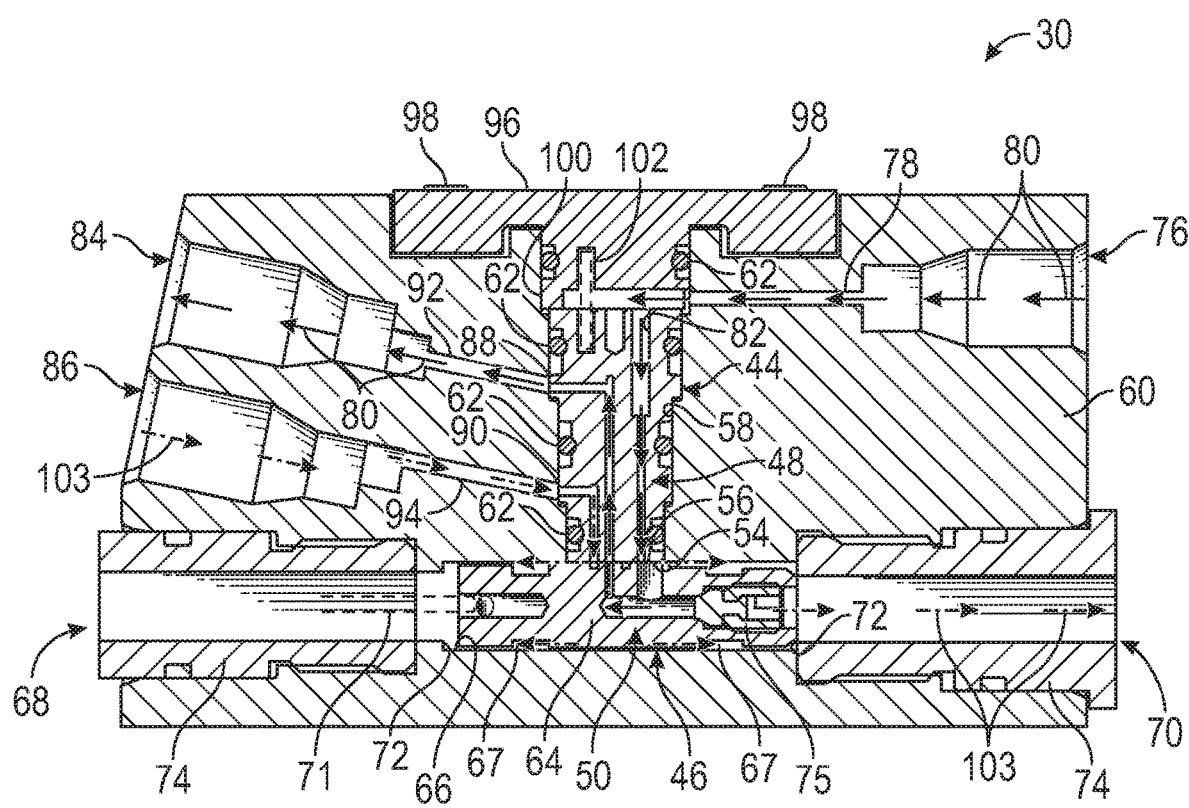
FIG. 4 is a view similar to that of FIG. 3 but showing the flow control valve in a different operational position, according to an embodiment of the present invention.

The operational position of dynamic component 46, e.g. shuttle 64, may be selectively shifted to establish a different fluid flow pattern, as illustrated in FIG. 4. In this operational position, mechanical member 71 has been used to shift shuttle 64 linearly to the right until the shuttle 64 engages the right-side abutment 72. This shifting of shuttle 64 aligns the hydraulic flow configuration 48 of stationary portion 44 with the corresponding hydraulic flow configuration 50 of shuttle 64 in a different flow configuration than that illustrated in FIG. 3.

In this new flow configuration, the supply fluid 80 flows in through supply port 76 and again travels under pressure along the flow conduit 78 and into hydraulic flow configuration 48 via inlet port 82. The flowing fluid is directed through the stationary portion 44 and into the corresponding hydraulic flow configuration 50 of shuttle 64. The fluid continues to flow through the corresponding hydraulic flow configuration 50 and back into the desired fluid channel of hydraulic flow configuration 48. However, because the shuttle 64 has been shifted to a new operational position the fluid flow 80 is directed through a different fluid channel of flow configuration 48 and out through port 88. After exiting port 88, the fluid flow 80 is directed through flow conduit 92 and out through reg port 84.

A simultaneous, lower pressure return fluid flow, as again represented by arrows 103, may be directed into the other reg port 86 in at least some applications. In the illustrated application, the return fluid flow flows through conduit 94 and into the hydraulic flow configuration 48 of stationary portion 44 via port 90. The return fluid flow is directed along the corresponding flow channels of hydraulic flow configuration 48 and discharged out of valve body 60. By way of example, the return flow may be directed along passages through or adjacent shuttle 64 until discharged through one of the passages 68, 70 or through another appropriate discharge passage.

Figure 5:
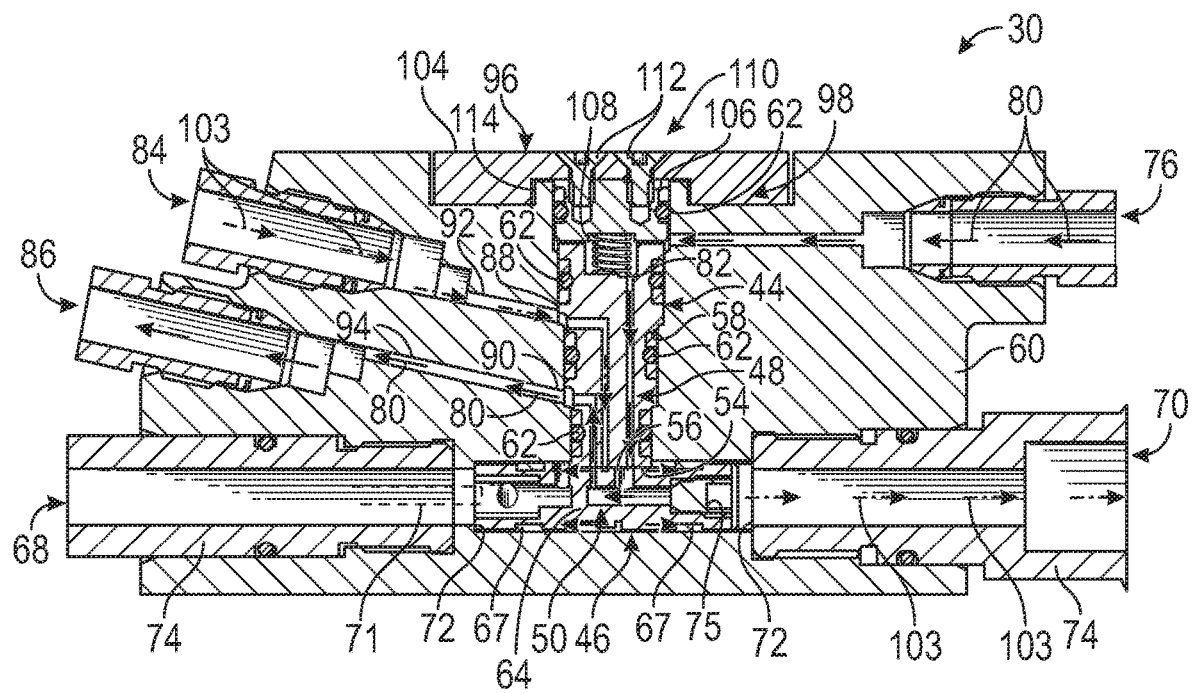
FIG. 5 is a cross-sectional view of another example of a flow control valve having shear seal components, according to an embodiment of the present invention.
Figure 6:
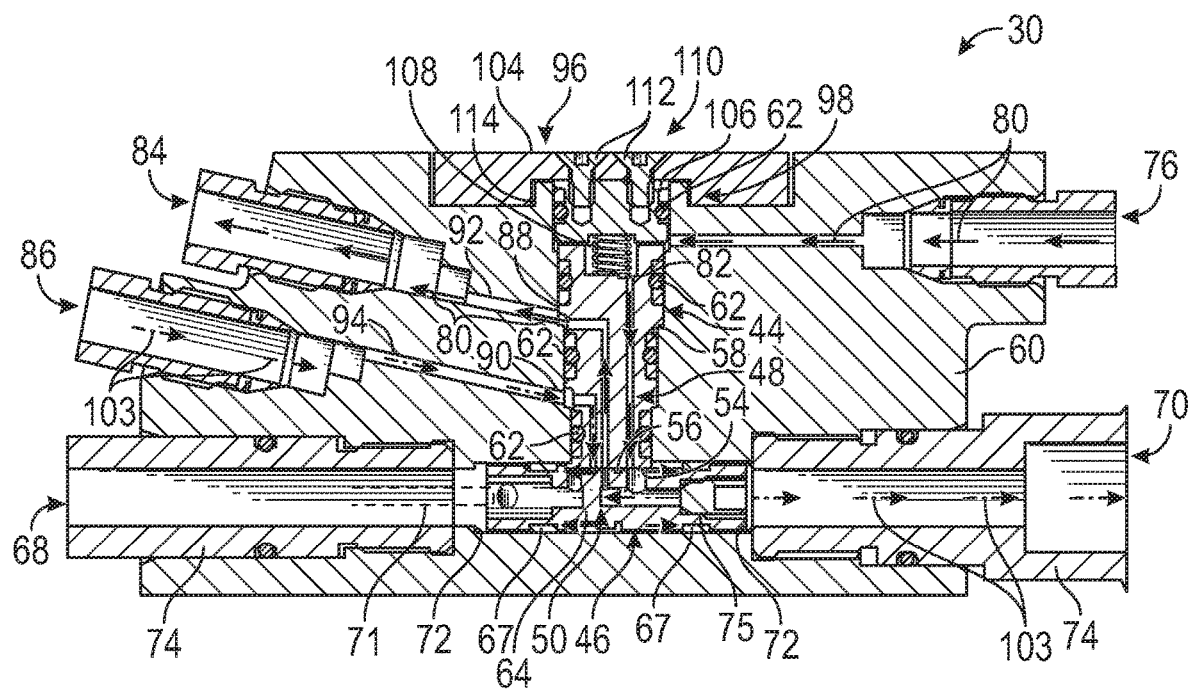
FIG. 6 is a view similar to that of FIG. 5 but showing the flow control valve in a different operational position, according to an embodiment of the present invention.

Referring generally to FIGS. 5 and 6, another embodiment of flow control valve 30 is illustrated. In this embodiment, many of the components are similar to those illustrated and described with respect to FIGS. 3 and 4 and the corresponding reference numerals remain the same. In the embodiment illustrated in FIGS. 5 and 6, however, certain features have been modified. For example, cover 96 has been formed as a two-part cover having an outer cover portion 104 which acts against an inner cover portion 106. The inner cover portion 106 may be similar in shape to the extended portion 100 described above. The inner cover portion 106 is received in recess 58 and similarly acts against stationary portion 44 at an end opposite the linear seal surface 54.

In some applications, an additional spring member 108 may be positioned between inner cover portion 106 and stationary portion 44 to help provide a biasing force against the stationary portion 44 so as to maintain the stationary portion 44 and dynamic component 46 in a linear sealing relationship. By way of example, the spring member 108 may be in the form of a coil spring, bellows, swellable element, shape memory alloy, curved washers, Belleville washers, or other suitable spring members.

In some embodiments, the inner cover portion 106 may have desired geometries or features which engage the stationary portion 44 to ensure the stationary portion 44 is at the desired angular orientation within recess 58. The proper angular orientation of stationary portion 44 ensures the desired fluid flow through hydraulic flow configuration 48. As illustrated, the outer cover portion 104 may be coupled to the inner cover portion 106 by suitable engagement features 110, such as the illustrated threaded fasteners 112.

The outer cover portion 104 may be secured to valve body 60 via fasteners 98 in the form of bolts threadably received in the valve body 60. However, the fastener or fasteners 98 also may be in the form of threads 114 located to enable cover 96 to be threaded into engagement with valve body 60 without separate bolts. In either embodiment, the threaded fastener or fasteners 98 allow cover 96 to be moved, e.g. threaded, to a sufficient position providing the desired preload with respect to the linear seal surfaces 54, 56. In some applications, the inner cover portion 106 may be threaded into engagement with the outer cover portion 104.

In the example illustrated in FIGS. 5 and 6, operation of the flow control valve 30 is similar to that described above with reference to the embodiment illustrated in FIGS. 3 and 4. During operation, the dynamic component 46, e.g. shuttle 64, is similarly shifted to a desired operational position by mechanical member 71 (or, in another embodiment, by applying higher pressure actuating fluid in either passage 68 or passage 70). As illustrated in FIG. 5, for example, mechanical member 71 has been used to shift shuttle 64 linearly to the left until the shuttle 64 engages the left-side abutment 72. This shifting of shuttle 64 aligns the hydraulic flow configuration 48 of stationary portion 44 with the corresponding hydraulic flow configuration 50 of shuttle 64 in a desired flow configuration.

The higher pressure supply fluid 80 flowing in through supply port 76 travels along the flow conduit 78 and into hydraulic flow configuration 48 via inlet port 82. The flowing fluid is directed through the stationary portion 44 and into the corresponding hydraulic flow configuration 50 of shuttle 64. The fluid continues to flow through the corresponding hydraulic flow configuration 50 and back into the desired fluid channel of hydraulic flow configuration 48 until exiting port 90 as further illustrated by arrows 80. After exiting port 90, the fluid 80 is directed through flow conduit 94 and out through reg port 86.

A simultaneous, lower pressure return fluid may be flowed into the other reg port 84, as represented by arrows 103. The return fluid flow flows through conduit 92 and into the hydraulic flow configuration 48 of stationary portion 44 via port 88. The return fluid flow is directed along other flow channels of hydraulic flow configuration 48 and discharged out of valve body 60. For example, the return flow may be directed along passages through or adjacent shuttle 64 until discharged through one of the passages 68, 70 or through another appropriate discharge passage.

The operational position of dynamic component 46, e.g. shuttle 64, may be selectively shifted to establish a different fluid flow pattern, as illustrated in FIG. 6. In this operational position, mechanical member 71 has been used to shift shuttle 64 linearly to the right until the shuttle 64 engages the right-side abutment 72. This shifting of shuttle 64 aligns the hydraulic flow configuration 48 of stationary portion 44 with the corresponding hydraulic flow configuration 50 of shuttle 64 in a different flow configuration than that illustrated in FIG. 5.

In this new flow configuration, the supply fluid 80 flows in through supply port 76 and again travels under pressure along the flow conduit 78 and into hydraulic flow configuration 48 via inlet port 82. The flowing fluid is directed through the stationary portion 44 and into the corresponding hydraulic flow configuration 50 of shuttle 64. The fluid continues to flow through the corresponding hydraulic flow configuration 50 and back into the desired fluid channel of hydraulic flow configuration 48. However, because the shuttle 64 has been shifted to a new operational position the fluid flow 80 is directed out through port 88. After exiting port 88, the fluid flow 80 is directed through flow conduit 92 and out through reg port 84.

A simultaneous, lower pressure return fluid flow, as again represented by arrows 103, flows into the other reg port 86 in at least some applications. In the illustrated application, the return fluid flow flows through conduit 94 and into the hydraulic flow configuration 48 of stationary portion 44 via port 90. The return fluid flow is directed along other flow channels of hydraulic flow configuration 48 and discharged out of valve body 60. By way of example, the return flow may be directed along passages through or adjacent shuttle 64 until discharged through one of the passages 68, 70 or through another appropriate discharge passage.

Depending on the application, the components of flow control valve 30 and of the overall well system 20 can be adjusted to accommodate a variety of structural, operational, and/or environmental parameters. For example, various types hydraulic actuators or control systems may be used for supplying hydraulic actuating fluid via pressure control line 68, 70. Additionally, various surface control systems 38 may be used to selectively control individual flow control valves 30 along the overall well system. Furthermore, the shape, size, configuration, and/or materials used to form the various flow control valve components, e.g. stationary portion, dynamic component, cover, valve body, may be selected according to the parameters of a given application. Similarly, the hydraulic flow configurations 48, 50 and the number of ports 76, 84, 86 also may be adjusted according to the parameters of a given application. In some applications, the shuttle 64 may be biased, e.g. spring biased, to one of the operational flow positions.

The number and arrangement of flow control valves 30 can vary substantially from one well application to another. The flow control valves 30 may be utilized in both lateral and vertical wellbores to achieve the desired flow control over fluid flows from surrounding well zones and/or into surrounding well zones. The flow control valves 30 also may be used with many types of completion strings or other well strings in production operations and/or other types of operations.

Although a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system for controlling flow in a borehole, comprising:
   a well string having a valve positioned to control a flow of fluid, the valve comprising:
   a body, a supply port, and a plurality of reg ports;
   a stationary portion disposed in the body and having corresponding fluid channels in fluid communication with the supply port and the plurality of reg ports;
   a dynamic component linearly movable with respect to the body and the stationary portion, the dynamic component having a hydraulic circuit positioned for cooperation with the corresponding fluid channels such that linear movement of the dynamic component between operational positions controls fluid coupling of the supply port with different reg ports; and
   a biasing member exerting a force on the stationary portion in a transverse direction relative to linear movement of the dynamic component to effectively force a linear seal surface, located at an end of the stationary portion, into sealing engagement with a corresponding linear seal surface of the dynamic component when the dynamic component is moved between positions linearly in a transverse direction with respect to the end of the stationary portion, wherein the biasing member comprises a cover bolted to the body.

2. The system is recited in claim 1, wherein the well string comprises a production string and the valve comprises a flow control valve.

3. The system is recited in claim 1, wherein the supply port comprises a single supply port.

4. The system is recited in claim 3, wherein the plurality of reg ports comprises two reg ports.

5. The system is recited in claim 1, further comprising a plurality of seals disposed between the stationary portion and the body.

6. The system as recited in claim 1, wherein the dynamic component comprises a shuttle slidably positioned in a corresponding passage of the body.

7. The system as recited in claim 6, wherein a plurality of shuttle seals are disposed between the shuttle and the body.

8. The system as recited in claim 1, wherein the cover comprises two separate components.

9. A system for controlling flow, comprising:
   a linear shear seal valve having:
   a body comprising a plurality of ports;
   a first component positioned in the body and having fluid channels in fluid communication with the plurality of ports;
   a second component linearly movable relative to the body and the first component between a first flow position and a second flow position controlling flow through the fluid channels to establish different flow patterns between the plurality of ports; and
   a biasing member in contact with the first component and positioned to bias the first component transversely with respect to linear movement of the second component to thus force a linear seal surface, located at an end of the first component, into sealing engagement with a corresponding linear seal surface of the second component when the second component is moved between positions linearly in a transverse direction with respect to the end of the first component.

10. The system as recited in claim 9, wherein the plurality of ports comprises a supply port and a plurality of reg ports.

11. The system as recited in claim 9, further comprising a plurality of seals disposed between the body and the first component to isolate individual flow paths.

12. The system as recited in claim 9, wherein the second component comprises a shuttle disposed in a passage of the body.

13. The system as recited in claim 12, wherein the shuttle is shifted between the first and second flow positions by a mechanical member.

14. The system as recited in claim 12, wherein the shuttle is shifted between the first and second flow positions by hydraulic pressure.

15. The system as recited in claim 9, wherein the biasing member comprises a cover tightened against the first component via fasteners threadably engaged with the body.

16. The system as recited in claim 9, further comprising a well string disposed in a wellbore, the linear shear seal valve being coupled into the well string.

17. A method, comprising:
  providing a first component with a hydraulic flow configuration and a second component with a corresponding hydraulic flow configuration;
  mounting the first component and the second component in a body such that the second component is shiftable between operational positions with respect to the first component;
  orienting the hydraulic flow configuration and the corresponding hydraulic flow configuration such that shifting between the operational positions enables different flow configurations directing flow of fluid through the hydraulic flow configuration and the corresponding hydraulic flow configuration; and
  biasing an end of the first component toward the second component and into sealing engagement with a side of the second component such that the first component is biased against the second component in a direction transverse to the direction of movement of the second component, wherein biasing comprises engaging a biasing member with a second end of the first component, the second end being opposite the end of the first component in sealing engagement with the side of the second component.

18. The method as recited in claim 17, wherein mounting comprises slidably mounting the second component in a passage of the body and sealing the first component and the second component with respect to the body.

19. The method as recited in claim 17, wherein biasing comprises using the biasing member and supply port pressure to enhance the sealing engagement.

20. The method as recited in claim 17, wherein the biasing member comprises a cover secured to the body.

* * * * *